United States Patent

Schopp et al.

US010064420B2

(10) Patent No.: US 10,064,420 B2
(45) Date of Patent: Sep. 4, 2018

(54) UMAMI FLAVOUR COMPOSITION FROM VEGETABLE PROCESSING

(71) Applicant: NESTEC S.A., Vevey (CH)

(72) Inventors: Silke Schopp, Markdorf (DE); Gert Bormann, Singen (DE); Dirk Jacobus Maritz, Singen (DE); Helge Fritsch, Singen (DE); Gregory Schmauch, Konstanz (DE); Karoline Michaela Schmid, Rielasingen-Worblingen (DE); Stephanie Thillard Schweizer, Dunningen (DE)

(73) Assignee: Nestec S.A., Vevey (CH)

( * ) Notice: Subject to any disclaimer, the term of this patent is extended or adjusted under 35 U.S.C. 154(b) by 185 days.

(21) Appl. No.: 14/367,751

(22) PCT Filed: Dec. 11, 2012

(86) PCT No.: PCT/EP2012/075068
§ 371 (c)(1),
(2) Date: Jun. 20, 2014

(87) PCT Pub. No.: WO2013/092296
PCT Pub. Date: Jun. 27, 2013

(65) Prior Publication Data
US 2015/0017308 A1 Jan. 15, 2015

(30) Foreign Application Priority Data
Dec. 23, 2011 (EP) ..................... 11195489

(51) Int. Cl.
| A23L 1/22 | (2006.01) |
| A23L 1/221 | (2006.01) |
| A21D 2/36 | (2006.01) |
| A23L 7/10 | (2016.01) |
| A23L 27/10 | (2016.01) |
| A23L 23/00 | (2016.01) |
| A23L 23/10 | (2016.01) |

(52) U.S. Cl.
CPC ............ *A23L 1/2215* (2013.01); *A21D 2/36* (2013.01); *A23L 7/10* (2016.08); *A23L 23/00* (2016.08); *A23L 23/10* (2016.08); *A23L 27/10* (2016.08); *A23L 27/11* (2016.08); *A23V 2002/00* (2013.01)

(58) Field of Classification Search
CPC .......... A23L 1/2215; A23L 7/10; A23L 27/10; A23L 27/11; A23L 23/00; A23L 23/10; A21D 2/36; A23V 2002/00

USPC ....... 426/506, 509, 490, 492, 495, 533, 534, 426/589, 615, 650
See application file for complete search history.

(56) References Cited

U.S. PATENT DOCUMENTS

| 5,301,694 A * | 4/1994 | Raymond ............. A24B 15/24 131/199 |
| 6,890,574 B1 | 5/2005 | Geifman et al. |
| 2009/0317536 A1 | 12/2009 | Cambeen et al. |
| 2010/0272878 A1 | 10/2010 | Dubbelman et al. |
| 2011/0305816 A1 | 12/2011 | Dubbelman et al. |
| 2012/0114827 A1 * | 5/2012 | Yoneshige .............. A23L 1/212 426/590 |

FOREIGN PATENT DOCUMENTS

| CN | 1191877 | 9/1998 |
| CN | 101675799 | 3/2010 |
| CN | 101735648 | 6/2010 |
| DE | 3229345 | 2/1984 |
| EP | 1344459 | 9/2003 |
| KR | 20020000207 | 1/2002 |
| KR | 20070017252 | 2/2007 |
| WO | 0114594 | 3/2001 |

OTHER PUBLICATIONS

XP002677291, Kerr et al. "Solid-liquid Extraction of Mushroom Solids and Concentration by Reverse Osmosis" Journal of Food Science, 1985, vol. 50, pp. 1300-1305.
XP002677289, Abstract of JP Application No. 1997-314190 dated May 13, 1997.
XP002677290, Abstract of "Evaluation of New Fish Sauces Prepared by Fermenting Hot-Water Extraction Waste of Stock From Dried Fish Using Various Kojis" Journal of Food, Agriculture & Environment, 2009, vol. 7.
XP002693634, Mintel "Vegetable Cubes" 1 page.
Australia Office Action for Application No. 2012358445, dated Mar. 17, 2016, 6 pages.
China Office Action for Application No. 201280064036.5, dated Feb. 22, 2016, 13 pages.

* cited by examiner

*Primary Examiner* — Leslie A Wong
(74) *Attorney, Agent, or Firm* — K&L Gates LLP

(57) ABSTRACT

A process for preparing a flavor composition having an umami flavor/taste and a MSG content of less than 1 wt % (% weight by total dry matter) comprising the steps of: a) heating vegetable matter in water at any given temperature to give cooking water containing flavor-active compounds extracted from the vegetable matter; b) separating the vegetable matter from the cooking water; and c) concentrating the cooking water to provide the flavor composition. Claims are also directed to the composition obtainable from the process and to food products such as soups and snacks including the composition.

13 Claims, 2 Drawing Sheets

Figure 2

| Vegetable | Umami taste perceived: Y(yes), N(no) | MSG in the liquid concentrate | MSG in the liquid concentrate in wt/%[3] |
|---|---|---|---|
| Tomato | Y | 1.27 g/100 g[1] | 3.065 % |
| Potato | N | 0.46 g/100 g[2] | - |
| Black olives | N | - | - |
| Green olives | N | 0.01 g/100 g[1] | 0.023 % |
| Onions | Y | 0.01 g/100 g[2] | ca. 0.02-0.03 % |
| Carrot | Y | 0.03 g/100 g[1] | 0.054 % |
| Avocado | N | 0.28 g/100 g[2] | - |
| Asparagus | N | - | - |
| Bell pepper | N | - | - |
| Cress | N | - | - |
| Broccoli | N | - | - |
| Cauliflower | N | - | - |
| Celery /celeriac | N | 0.01 g/100 g[1] | 0.046 % |
| Eggplant | N | - | - |
| Turnip | N | - | - |
| Fennel | N | - | - |
| Kelek - Melon cucumber (*Cucumis melo*) | Y | 0.01 g/100 g[1] | 0.034 % |
| Chick peas | N | - | - |
| Leek | N | 0.37 g/100 g[2] | - |
| Parsnip | N | 0.12 g/100 g[2] | - |
| Pumpkin | N | - | - |
| Cabbage | N | 0.2 g/100 g[1] | 0.786 % |
| Mirepoix (carrot, leek, celery & onion) | N | 0.09 g/100 g[1] | 0.260 % |
| Plantain | N | - | - |
| Salsify | N | - | - |
| Corn | Y | 0.04 - 0.42 g/100 g[1] | 0.165 - 0.671 |
| Beetroot | Y | 0.01 - 0.18 g/100 g[1] | 0.049 - 0.783 % |
| Sweet Pea | Y | 0.01 g/100 g[1] | 0,052 % |
| Pea | Y | 0.02 g/100 g[1] | 0.113% |
| Sweet Potato | Y | 0.01 g/100 g[1] | 0.031 % |

UMAMI FLAVOUR COMPOSITION FROM VEGETABLE PROCESSING

CROSS REFERENCE TO RELATED APPLICATIONS

The present application is a National Stage of International Application No. PCT/EP2012/075068, filed on Dec. 11, 2012, which claims priority to European Patent Application No. 11195489.7, filed Dec. 23, 2011, the entire contents of which are being incorporated herein by reference.

TECHNICAL FIELD

The invention relates to a flavour composition having an umami flavour obtained from the blanching or cooking water of vegetables. In particular, the invention relates to flavour compositions obtained from the side streams of vegetable processing by membrane filtration or other concentration technologies.

BACKGROUND

The rounded umami taste of savoury products produced by the food industry is often provided by combinations of monosodium glutamate (MSG), inosine monophosphate (IMP) and guanosine monophosphate (GMP), or yeast extracts or natural flavours. The common base of these umami providers is very often MSG, which can be produced by fermentation of *Corynebacterium glutamicum* strains and then purified, or is naturally occurring in some raw materials, such as meat, fish, breast milk, tomatoes, and parmesan cheese. Consumer perception of added MSG is generally negative in some countries, especially Germany, France and the US. There is therefore a need for alternative solutions to the problem of delivering umami flavour providers or enhancers.

The taste compounds in vegetables come from interactions between different sensory factors, either from carbohydrate storage compounds (especially mono- and disaccharides), the texture of the plant material provided by structural polymers, or from secondary metabolites. Taste compounds in vegetables also depend on growing conditions, storage, and the preparation and cooking methods used for the vegetables. Of the secondary metabolites, the terpenoids are the major contributors of taste and flavour, followed by glucosinolates, alkyl and alkenyl cysteine sulphoxides, and phenolic compounds. Individual terpenoids are perceived to have a wide range of flavours and aromas, which tend to blend into the characteristics of carrot. Enzymatic cleavage of glucosinolates produces the typical flavours and aromas of the *Brassicas*. Methyl cysteine sulphoxide also contributes to *Brassica* flavour, while the cleavage products of this and other alkyl or alkenyl cysteine sulphoxides produce the pungent and sulphurous flavours characteristics of alliums. Phenolic compounds generally produce bitter and astringent flavours, and have been detected in all groups of vegetables (Brückner B. and Wyllie G., 2008. Fruit and vegetable flavor. Recent advances and future prospects. Woohead Publishing, 2, 11).

During blanching or cooking of vegetables, taste active ingredients dissolve in the water. This water is typically discarded, which can cause environmental problems due to the high chemical oxygen demand of the dissolved compounds.

Many techniques have been repeatedly used to extract and concentrate taste and aroma molecules in food matrices. In culinary art concentration is mostly done by reduction. Membrane technology is one of the earliest successful industrial applications of technology in this field (Sano, C. 2009, American Journal of Clinical Nutrition. 90:3, 728s-732s). The main use of reverse osmosis is the concentration of liquid foods, to complement or replace evaporation. Nanofiltration is used for desalting and de-acidification with partial concentration, while ultrafiltration is used for fractionation, concentration and purification of food streams. Microfiltration is used for clarification and removal of suspended matter to replace centrifuges and filter presses, and also for pasteurising and sterilising liquids instead of using heat.

Known processes of concentrated mushroom blanching water are based on vacuum evaporation or steam jacket kettle concentration. Chiang et al. (1986, Journal of Food Science 51(3), 608-613) concentrated the blanch water to 13% of solids using ultrafiltration and reverse osmosis. Nonvolatile components like IMP and GMP were analyzed and 84% were recovered. These ribonucleotides were indicated to replace or enhance MSG. The major volatile compounds recovered were 1-octen-3-ol, 3-octanol, and 3-octanone. The aroma quality was evaluated by a sensory panel. No change in quality from blanching water to concentrate was detectable. The extraction of mushroom slices at different temperatures and subsequent ultrafiltration and reverse osmosis of the extract enables the aromas compounds to be recovered (Kerr, L. H. et al., 1985, Journal of Food Science 50, 1300-1305).

Tomatoes are rich in natural glutamic acid. EP 2068650 discloses the use of membrane technologies for removing lycopene and citric acid from a tomato concentrate, leading to a clear and tasteless tomato concentrate.

Seafood processing industries have used membrane filtration treatment since the 1970s to recover valuable peptides or proteins in defrosting, washing or cooking waters (Cros et al., 2005, Journal of Food engineering, 69, 425-436). This publication discloses the concentration of mussel cooking water to produce a natural aroma concentrate and a clean water stream. The production of aromatic concentrates from seafood cooking juices can be achieved using reverse osmosis, but the high salt content makes a preliminary desalination step necessary. Desalination with electrodialysis to reduce salt content by 85% is possible without significant aroma loss. Further desalination will lead to a change in the aroma profile, which is dependent on the membrane material (Cros et al., 2005, Desalination, 180, 263-269). Cooking water from buckies, shrimps and tuna with a high polluting load must be treated before being returned to the environment. Combinations of ultrafiltration and nanofiltration, as well as ultrafiltration and reverse osmosis were checked for their ability to recover flavours and to clean the waste water (Vandanjon, L. et al. 2002, Desalination 144, 379-385). Cooking juices from tuna processing have a high polluting load, including high chemical oxygen demand, high nitrogen content and large amounts of dry matter. A high NaCl load is also problematic (Walha, K. et al., 2009, Process Safety and Environmental Protection, 87, 331-335). Tuna cooking juices contain interesting fishy flavours. Highly salted tuna cooking juices can be concentrated by a one- or two-step nanofiltration. The flavour intensity of the juices can be decreased by nanofiltration, thereby modifying the aroma properties (Walha, K. et al., 2011, LWT—Food Science and Technology, 44, 153-157).

The principal disadvantage of the above known vegetable processing side streams for delivering an umami flavour is that the MSG present becomes concentrated during further processing and leads to an unacceptably high level of MSG in any flavouring composition prepared from it. The applicant has now found that vegetable cooking or blanching waters, which are side streams in the food industry, especially from pea or corn, can be concentrated by membrane processes and used as natural flavour solutions. In other words, the applicant has found a way to produce umami flavour compositions from vegetable extracts and vegetable side streams that does not concentrate the natural MSG present. The invention is based on the use of membrane technology and other concentration techniques like evaporation and reduction. Until now, membrane filtration technology has only been used for processing food processing side streams for waste water cleaning and desalination in the seafood industry, but not for obtaining a umami flavour.

It is therefore an object of the invention to provide an umami flavour composition obtained from vegetable processing side streams, or at least to provide an useful alternative to existing flavour compositions.

STATEMENTS OF THE INVENTION

In a first aspect of the invention there is provided a process for preparing a flavour composition having an umami flavour and a MSG content of less than 1 wt % (% weight by total dry matter) comprising the steps of:
 a) heating vegetable matter in water at any given temperature to give cooking water containing flavour-active compounds extracted from the vegetable matter;
 b) separating the vegetable matter from the cooking water; and
 c) concentrating the cooking water to provide the flavour composition.

The vegetable matter may be heated at any suitable temperature and for any suitable time, but preferably at 90° C. to 100° C. for 2 to 15 minutes. The vegetable matter may be whole vegetables or vegetable pieces, or any combination thereof. In preferred embodiments of the invention, the vegetable matter is selected from the group consisting of pea (*Pisum sativum* var.), corn (*Zea mays* var.), red beetroot, white beetroot, golden beetroot (*Beta vulgaris* var.), sweet potato (*Ipomoea batatas* var.), carrot (*Daucus carota* ssp.), onion (*Allium* ssp.), kelek-melon cucmber (*Cucumis melo*), and any combination thereof.

Preferably, the cooking water from step a) is cooled before any filtration operation of step c). The one or more membrane filtration operations may include ultrafiltration, nanofiltration, microfiltration, cross flow filtration, reverse osmosis, or electro osmosis.

Preferably, ultrafiltration is performed using a membrane having a pore size cut-off of 1 to 10 nm, preferably 5 nm. It is also preferred that the membrane is a ceramic membrane. Nanofiltration is preferably performed using a membrane having a pore size cut-off of 0.1 to 1 nm. It is also preferred that the membrane is a polymer membrane.

In some preferred embodiments, step c) comprises an ultrafiltration operation followed by a reverse osmosis filtration. The cooking water is preferably subjected to ultrafiltration to give a first retentate and a first permeate, and the first permeate is subjected to reverse osmosis to give a second retentate and a second permeate. The first retentate, the first permeate, the second retentate and the second permeate may be combined.

In a second aspect of the invention there is provided a flavour composition prepared by the process of the invention.

Preferably, the flavour composition has an MSG content of less than 1 wt % by weight of concentrate.

The flavour composition may be in any suitable form, but is preferably a tablet or cube, a powder, a paste, granules, or a liquid.

In the further aspect, the invention provides a food product prepared from or containing a flavour composition selected from the group comprising culinary products, such as bouillons, sauces, and dehydrated soups, dry foods such as snacks, cereals and biscuits, chilled and frozen products, such as prepared meals, nutritional products, flavours and flavour ingredients, food supplements, pet foods, and beverages. Preferably, the flavour composition comprises 0.01 to 50 wt %, more preferably 0.5 to 15 wt % by total weight of the food product.

BRIEF DESCRIPTION OF THE FIGURES

FIG. 2 is an overview of the umami taste of different vegetable flavor compositions.

DETAILED DESCRIPTION

Figure 1:
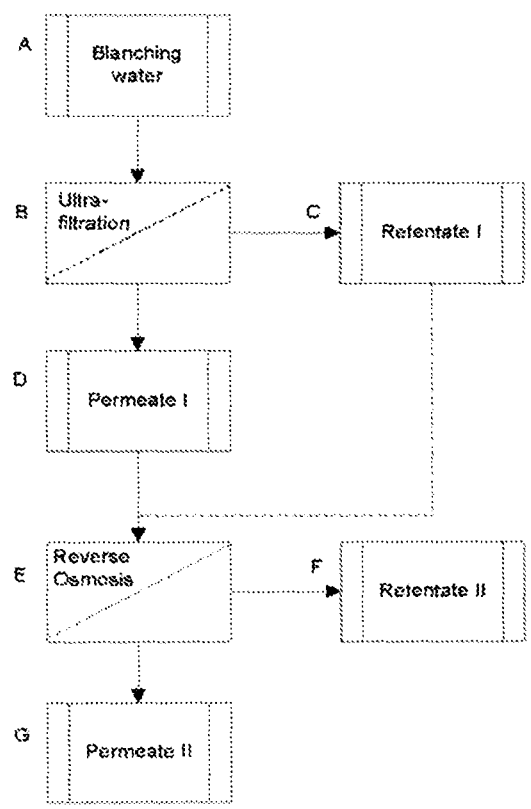
FIG. 1 is a flow chart showing the filtration steps of the process of the invention.

The invention relates to a process for preparing a flavour composition having an umami flavour comprising heating vegetable matter in water at up to 100° C. to give cooking water containing flavour-active compounds extracted from the vegetable matter, separating the vegetable matter from the cooking water, and subjecting the cooking water to one or more membrane filtration operations to provide the flavour composition. Flavour compositions and food products obtainable using this process also form part of the invention.

The process provides an umami taste to culinary products without the addition of any known taste enhancer such as MSG, ribonucleotides (IMP, GMP), or yeast extracts. The applicant has found that the water from canned corn, the cooking water from peas and from beetroots (red and golden) and other vegetables provides a umami taste after concentration.

During the blanching or cooking step of the process, taste active ingredients dissolve in the cooking water. This water is usually discarded in most cases, which causes environmental problems due to its high chemical oxygen demand. The invention employs membrane technologies (such as reverse osmosis, electro osmosis, cross flow filtration, nanofiltration) and combinations thereof, as well as concentration techniques like evaporation and reduction, to concentrate the valuable flavour active substances present in vegetable cooking or blanching side streams. If required, a heating step can be applied afterwards.

In addition to the positive environmental effect of producing clean fresh water from industrial side streams which can be used in the factory again, the concentrated substances form the base of a flavour composition that provides an umami taste. The concentrate can either directly act as an umami provider or act as side player to enhance the umami perception of the natural MSG already present. There is also a significant advantage in providing a strong umami flavour without the addition of MSG or any other flavour ingredient or flavour enhancing ingredient. Such ingredients can have a negative consumer perception. Their avoidance therefore enables more consumer friendly product labeling.

The main benefit is providing a umami taste without the addition of taste enhancers. Peas, corn, beetroot and other vegetables contain taste enhancing substances or precursors thereof that are different to MSG and the known ribonucleotides. Therefore, the use of these vegetables to enhance the umami perception is a new approach. An umami trained panel assessed a taste enhancer free soup as having a significant umami flavour, when using the cooking water directly. The natural MSG value for the corn cooking juice from cans is 0.04 g/100 mL and for peas 0.02 g/100 mL in reduced canned pea water. This indicates clearly that the umami perception does not come from naturally occurring MSG. The method of applying membrane processing to concentrate cooking juices is known for the use in seafood production, but primarily to clean highly polluted waste water. The concentrates obtained from this process can be used as flavour ingredient to give a fishy note to products.

Vegetable blanching waters from, for example pea or corn, are common side steams in the vegetable processing food industry. The blanching process is typically performed for 2 to 10 min between 90 to 100° C. to deactivate enzymes while maintaining the taste, colour and texture of the vegetables during subsequent processing. This blanching water is ideally suited for use in the membrane concentration steps of this invention.

A general process scheme is shown in FIG. 1. The blanching water (A) is first filtered through the ultrafiltration membrane (B). The Permeate I (D) is then filtered through the reverse osmosis membrane (E). Permeate II (G) has fresh water quality and can be used again in the process of the factory. Retentate II (F) contains the concentrated flavour active substances and can be used with or without drying in products for enhancing the taste in savoury products. Retentate I (C) can also be filtered through the reverse osmosis membrane (E). Retentate I can be mixed with Retentate II.

It should be understood that the vegetable matter may be heated at any suitable temperature and for any suitable time to provide the blanching or cooking water for use in the process of the invention.

It is as well possible to perform an extraction of vegetables as such or of parts thereof with the target to get a vegetable extract. These extract can afterwards being concentrated by membrane technologies, evaporation, reduction or combinations thereof.

The invention is applicable to a wide range of vegetables including pea (*Pisum sativum* var.), corn (*Zea mays* var.), red beetroot, white beetroot, golden beetroot (*Beta vulgaris* var.), sweet potato (*Ipomoea batatas* var.), carrot (*Daucus carota* ssp.), onion (*Allium* ssp.).

The pore cut-off size of the membranes used may be any suitable size to maximise the concentration effect of desired flavour ingredients in the retentates. Preferably, ultrafiltration is performed using a membrane having a pore size cut-off of 1 to 10 nm, preferably 5 nm. Nanofiltration is preferably performed using a membrane having a pore size cut-off of 0.1 to 1 nm.

The flavour composition of the invention typically contains only a small amount of MSG, which is naturally derived from or present in the vegetable matter processed, and therefore is usually present in a low concentration. As the flavour composition of the invention is not consumed pure but e.g. added as a soup ingredient, the final MSG concentration is less than 0.5 g/L in the final dish. The taste threshold is described in literature between 0.255 and 0.5 g MSG/L (1.5-3 mmol/L) (Behrens, M., et al. (2011) Sweet and Umami Taste: Natural Products, Their Chemosensory Targets, and Beyond; Angew. Chem. Int. Ed., 50, 2220-2242).

The flavour composition may be in solid or liquid form, for example a tablet or cube, a powder, a paste, granules, or a liquid.

The food product of the invention, prepared from or containing a flavour composition of the invention, may be selected from the group comprising culinary products, such as bouillons, sauces, and dehydrated soups, dry foods such as snacks, cereals and biscuits, chilled and frozen products, such as prepared meals, nutritional products, flavours and flavour ingredients, food supplements, pet foods, and beverages. A typical food product would comprise the flavour composition in an amount 0.01 to 50% by total weight of the food product.

Those skilled in the art will understand that they can freely combine all features of the present invention disclosed herein. In particular, features described for the process of the present invention may be combined with the product of the present invention and vice versa. Further, features described for different embodiments of the present invention may be combined. Further advantages and features of the present invention are apparent from the examples.

EXAMPLES

The invention is further described with reference to the following examples. It will be appreciated that the invention as claimed is not intended to be limited in any way by these examples.

In the following examples the general method for preparing the natural taste enhancer from vegetable side streams is described in more detail. Example 1 describes a general process for obtaining the product using the blanching water of peas. Example 2 describes how single membrane fractions can be combined to give a higher yield. Example 3 describes the use of other vegetable blanching waters.

Example 1: General Method for Using Vegetable Side Streams for the Preparation of Natural Flavour Active Substances Peas were blanched under the following conditions: 30 kg peas with 70 L water, 95° C. for 15 min in a steam blanching tunnel. The pea blanching water was frozen until the membrane filtration at −20° C.

After thawing the blanching water, a first filtration was carried out using an ultrafiltration unit under the following conditions: 4 L of blanching water was added to a receiving tank (A in FIG. 1) of the membrane system. The tank contents were constantly homogenised by a stirring at moderate speed. Ultrafiltration (B) was carried out using a tubular ceramic membrane (cut-off: 5 nm) with a total effective surface area of 13 $m^2$. The pea cooking juice was circulated tangentially over the membrane. The flux was 126 L/h, the temperature controlled using a water bath at 38° C., and the pressure was maintained at 0.8 bar. Permeate I volume was 3 L and Retentate I volume was 1 L. Permeate I was subjected to reverse osmosis (E) using a tubular polymeric membrane (cut-off: 1 nm) with a total surface area of 2 $m^2$. 2.3 L of permeate I (D) was fed into the reverse osmosis tank and circulated until a volume of 2.3 L Permeate II and 0.3 L Retentate II was obtained.

The umami intensity of each fraction was rated by a trained sensory panel team. The liquids were tasted following dilution in water back to the dry mass of the initial blanching water. The results are shown in Table 1, and clearly indicate that Retentate II has a much higher umami flavour than the other fractions. The MSG value in the undiluted Retentate II is 0.026 g/100 mL, which is below the taste threshold of MSG. The taste threshold is described in the literature between 0.255 and 0.5 g MSG/L (1.5-3 mmol/L) (Behrens, M., et al. (2011) Sweet and Umami Taste: Natural Products, Their Chemosensory Targets, and Beyond; Angew. Chem. Int. Ed., 50, 2220-2242).

TABLE 1

Umami intensity of different fractions after filtration (re-diluted back to the dry mass of the initial blanching water). The Sample letters refer to FIG. 1. The results given are the number of people from a team of four trained tasters rating the umami intensity (0 = no umami; 1 = umami barely perceivable; 2 = umami clearly perceivable; 3 = strong umami).

| | Umami Intensity | | | |
|---|---|---|---|---|
| Sample | 0 | 1 | 2 | 3 |
| Pea blanching water (A) | | 1 | 3 | |
| Retentate I (C) | | 1 | 1 | 2 |
| Permeate I (D) | | 2 | 2 | |
| Retentate II (F) | | | 1 | 3 |
| Permeate II (G) | 4 | | | |

Example 2: Combination of Single Fractions from Membrane Filtration Steps

The single fractions from Example 1 were combined and assessed for umami taste in the same manner.

TABLE 2

Umami perception of a combination of single fractions (re-diluted back to the dry mass of the initial blanching water) obtained from Example 1. The Sample letters refer to FIG. 1. The results given are the number of people from a team of four trained tasters rating the umami intensity (0 = no umami; 1 = umami barely perceivable; 2 = umami clearly perceivable; 3 = strong umami).

| | Umami Intensity | | | |
|---|---|---|---|---|
| Sample | 0 | 1 | 2 | 3 |
| Pea blanching water (A) | | 1 | 3 | |
| C + D + F + G | | 2 | 2 | |
| C + F | | | 3 | 1 |
| C + D | 1 | 2 | 1 | |
| D + F | | 1 | 3 | |

Example 3: Use of Other Vegetable Blanching Waters

The general method of Example 1 was followed for corn blanching water. The same flavour assessment was also followed. The MSG value in the undiluted Retentate II is 0.042 g/100 mL, which is below the taste threshold of MSG.

TABLE 3

Umami intensity of different fractions after filtration (re-diluted back to the dry mass of the initial blanching water). The Sample letters refer to FIG. 1. The results given are the number of people from a team of eight trained tasters rating the umami intensity (0 = no umami; 1 = umami barely perceivable; 2 = umami clearly perceivable; 3 = strong umami).

| | Umami Intensity | | | |
|---|---|---|---|---|
| Sample | 0 | 1 | 2 | 3 |
| Corn blanching water (A) | | 7 | 1 | |
| Retentate I (C) | | 8 | | |
| Permeate I (D) | | 2 | 2 | |
| Retentate II (F) | | 2 | 3 | 4 |
| Permeate II (G) | 8 | | | |

Example 4: Application of Other Concentration Methods

Another method for preparing the composition of the invention with corn is as follows: Heat the corn in water (ratio vegetables to water 1:2) at 95° C. for 40 min. Strain to remove the solid fragments (larger than 1 mm) and retain the aqueous extract. Reduce the water content at 90-100° C. for a time between 10 to 120 min to concentrate the flavour compounds.

Example 5: Use of Other Vegetables

Different vegetables were used for watery extraction and concentration by reduction. Thereby, liquid concentrates were obtained as flavour compositions as specified in FIG. 2. The liquid flavour compositions were added to a no MSG containing bouillon base in an amount ranging from 0.8 to 3.6 (v/v) %. The resulting bouillon solutions were then tasted by panel of trained tasters and evaluated for umami taste that was provided by the liquid flavour compositions. The results of this evaluation are reported in FIG. 2 as Y (yes) where such an umami taste was perceived, and as N (no) where such an umami taste was not perceived by the trained panel. The concentrations of MSG as in the original liquid concentrates, i.e. the flavour compositions, is also reported in FIG. 2 in g/100 g liquid, as well as in dry weight (wt) % per absolute dry matter content in those concentrates.

Referring to FIG. 2: Superscript 1 referred to wet concentrate, measured by HPLC (Gratzfeld-Huesgen, 2002, Sensitive and reliable amino acid analysis in protein hydrolysates using Agilent 1100 Series. Agilent Tech Note 5968-5658E) Superscript 2 denotes literature value of complete edible vegetable (Souci, Fachmann and Kraut, 2012, Food Composition and Nutrition Tables, medpharm GmbH Scientific Publishers, Stuttgart, Germany, Online edition). Superscript 3 denotes MSG measured by HPLC (Gratzfeld-Huesgen, 2002, Sensitive and reliable amino acid analysis in protein hydrolysates using Agilent 1100 Series. Agilent Tech Note 5968-5658E).

The results show that for the selected vegetable extracts from onion, carrot, kelek, corn, beetroot, sweet pea, pea and sweet potato, a clear umami taste can be perceived which is not or only very partly due to the presence of MSG as the level of MSG in those concentrated flavor compositions is well below 1 wt % (% per weight of total dry matter). The perception of the umami taste from the tomato extract can be deducted as being due to the elevated presence of MSG in such concentrates.

It is to be appreciated that although the invention has been described with reference to specific embodiments, variations and modifications may be made without departing from the scope of the invention as defined in the claims. Furthermore, where known equivalents exist to specific features, such equivalents are incorporated as if specifically referred to in this specification.

The invention claimed is:

1. A process for preparing a flavor composition having an umami flavor and a MSG content of less than 1 wt % by total dry matter, the process comprising:
    heating a vegetable matter selected from the group consisting of pea, corn, red beetroot, white beetroot, golden beetroot, sweet potato, kelek-melon cucumber, and combinations thereof in water at 90° C. to 100° C. for 2 to 15 minutes in the absence of yeast extract to give cooking water containing flavor-active compounds extracted from the vegetable matter;
    separating the vegetable matter from the cooking water; and
    concentrating the cooking water to provide the flavor composition, the concentrating step comprising an ultra-filtration operation followed by a reverse osmosis filtration.

2. The process of claim 1, wherein the MSG content of the flavor composition is less than 0.6 wt % by total dry matter.

3. The process of claim 1, wherein the vegetable matter is selected from the group consisting of whole vegetables, vegetable pieces, and combinations thereof.

4. The process of claim 1, wherein the cooking water is cooled before the concentrating step.

5. The process of claim 1, wherein the ultra-filtration is performed using a membrane having a pore size cut-off of 1 to 10 nm.

6. A flavor composition having an umami flavor and a MSG content of less than 1 wt % by total dry matter and prepared by a process comprising:
    heating a vegetable matter selected from the group consisting of pea, corn, red beetroot, white beetroot, golden beetroot, sweet potato, kelek-melon cucumber, and combinations thereof in water at 90° C. to 100° C. for 2 to 15 minutes in the absence of yeast extract to give cooking water containing flavor-active compounds extracted from the vegetable matter;
    separating the vegetable matter from the cooking water; and
    concentrating the cooking water to provide the flavor composition, the concentrating step comprising an ultra-filtration operation followed by a reverse osmosis filtration.

7. The flavor composition of claim 6, wherein the MSG content of the flavor composition is less than 0.6 wt % by total dry matter.

8. The flavor composition of claim 6, which is in a form selected from the group consisting of a tablet, a cube, a powder, a paste, granules, and a liquid.

9. The process of claim 1, wherein the ultra-filtration operation is performed using a membrane having a pore size cut-off of 1 to 10 nm.

10. The process of claim 1, comprising freezing the cooking water before the concentrating.

11. The process of claim 1, wherein the vegetable matter is peas, and the peas are heated in water at 95° C. for 15 minutes to provide the cooking water.

12. The process of claim 1, wherein the MSG content of the flavor composition is less than 0.5 grams of MSG per liter.

13. The process of claim 1, where the vegetable matter is corn, the corn is heated in water at 95° C. for 15 minutes to provide the cooking water, and the concentrating step further comprises reducing the water content at 90-100° C. for 10 to 120 minutes.

* * * * *